(12) United States Patent
Zhang et al.

(10) Patent No.: US 11,303,394 B2
(45) Date of Patent: Apr. 12, 2022

(54) HARQ RETRANSMISSION METHOD AND APPARATUS AND TRANSMISSION DEVICE

(71) Applicant: CHINA ACADEMY OF TELECOMMUNICATIONS TECHNOLOGY, Beijing (CN)

(72) Inventors: Rui Zhang, Beijing (CN); Jiaqing Wang, Beijing (CN); Fei Wan, Beijing (CN); Baoming Bai, Beijing (CN); Shaohui Sun, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 14 days.

(21) Appl. No.: 16/633,146

(22) PCT Filed: Aug. 3, 2018

(86) PCT No.: PCT/CN2018/098516
§ 371 (c)(1),
(2) Date: Jan. 22, 2020

(87) PCT Pub. No.: WO2019/029446
PCT Pub. Date: Feb. 14, 2019

(65) Prior Publication Data
US 2020/0396027 A1 Dec. 17, 2020

(30) Foreign Application Priority Data
Aug. 11, 2017 (CN) .......................... 201710687072.1

(51) Int. Cl.
*H04L 1/18* (2006.01)
*H04L 1/00* (2006.01)

(52) U.S. Cl.
CPC .......... *H04L 1/1819* (2013.01); *H04L 1/0063* (2013.01); *H04L 1/189* (2013.01); *H04L 1/1874* (2013.01)

(58) Field of Classification Search
None
See application file for complete search history.

(56) References Cited

U.S. PATENT DOCUMENTS

| 2010/0146355 | A1 | 6/2010 | Jiang et al. |
| 2011/0239075 | A1 | 9/2011 | Xu et al. |
| 2012/0110406 | A1* | 5/2012 | Sun ........................ H04L 1/0071 714/751 |

(Continued)

FOREIGN PATENT DOCUMENTS

| CN | 101188428 A | 5/2008 |
| CN | 101286825 A | 10/2008 |
| CN | 101325474 A | 12/2008 |

(Continued)

OTHER PUBLICATIONS

First Office Action and Search Report from CN app. No. 201710687072. 1, dated Dec. 4, 2019, with English translation provided by Global Dossier.

(Continued)

*Primary Examiner* — Joseph E Avellino
*Assistant Examiner* — The Hy Nguyen
(74) *Attorney, Agent, or Firm* — Ladas & Parry, LLP

(57) ABSTRACT

An HARQ retransmission method and apparatus and a transmission device are provided. The method includes: determining a transmission parameter; and selecting dynamically a transmission starting position of each retransmission redundancy version from a circular buffer according to the transmission parameter.

7 Claims, 6 Drawing Sheets

Determining a transmission parameter — 101

Selecting dynamically a transmission starting position of each retransmission redundancy version from a circular buffer according to the transmission parameter — 102

(56) References Cited

U.S. PATENT DOCUMENTS

| | | | | |
|---|---|---|---|---|
| 2017/0034817 A1* | 2/2017 | Park | ................... | H04L 5/0035 |
| 2017/0373809 A1* | 12/2017 | Kim | ................ | H03M 13/6362 |
| 2018/0278370 A1* | 9/2018 | Jeong | ................. | H04L 1/0045 |
| 2019/0013901 A1* | 1/2019 | Nimbalker | ............ | H04L 1/0067 |
| 2019/0097767 A1* | 3/2019 | Qin | ..................... | H04L 1/0014 |
| 2019/0356333 A1* | 11/2019 | Ma | .................. | H03M 13/6393 |

FOREIGN PATENT DOCUMENTS

| | | | |
|---|---|---|---|
| CN | 103312442 A | | 9/2013 |
| KR | 10-20170116133 | * | 9/2017 |
| WO | 2017131813 A1 | | 8/2017 |

OTHER PUBLICATIONS

International Search Report from PCT/CN2018/098516, dated Oct. 8, 2018, with English translation provided by WIPO.
Written Opinion from the International Searching Authority from PCT/CN2018/098516, dated Oct. 8, 2018, with English translation provided by WIPO.
International Preliminary Report on Patentability from PCT/CN2018/098516, dated Feb. 11, 2020, with English translation provided by WIPO.
"IR-HARQ scheme for NR LDPC codes" R1-1710045, 3GPP TSG RAN WG1 NR Ad-Hoc#2, Qingdao, P.R. China, Jun. 27-30, 2017.
"IR-HARQ scheme for NR LDPC codes" R1-1712432, 3GPP TSG RAN WG1 Meeting #90, Prague, Czechia, Aug. 21-25, 2017.
"Consideration on coding chain for eMBB data channel", R1-1707177, 3GPP TSG RAN WG1 Meeting #89, Hangzhou, China, May 15-19, 2017.
"Rate matching for LDPC codes", R1-1711438, 3GPP TSG RAN WG1 NR Ad-Hoc#2, Qingdao, China, Jun. 27-30, 2017.
Extended European Search Report from EP app. No. 18844301.4, dated Jul. 15, 2020.

* cited by examiner

HARQ RETRANSMISSION METHOD AND APPARATUS AND TRANSMISSION DEVICE

CROSS-REFERENCE TO RELATED APPLICATIONS

The present application is a U.S. national phase application of a PCT Application No. PCT/CN2018/098516 filed on Aug. 3, 2018, which claims priority to Chinese Patent Application No. 201710687072.1 filed in China on Aug. 11, 2017, the disclosures disclosure of which are incorporated in their entireties by reference herein.

TECHNICAL FIELD

The present disclosure relates to the field of communication technology, in particular to an HARQ retransmission method and apparatus and a transmission device.

BACKGROUND

As the fourth-generation (4G) mobile communication enters the stage of large-scale commercialization, the future-oriented fifth-generation (5G) mobile communication technologies already becomes the focus of research and development worldwide. With the joint effort of global industrial and academic communities, the 5G vision and critical capability requirements are generally determined. Formulation of international standards has officially begun. Hybrid automatic repeat request (HARQ) is one of the important technologies.

According to 4G Long-Term Evolution (LTE)-turbo HARQ in the related art, as shown in FIG. 2, four starting points ($S_0$, $S_1$, $S_2$, $S_3$) are defined for four redundancy versions of HARQ. Transmission is initiated from a fixed starting point each time. However, with a 5G low-density parity-check (LDPC) code, such a retransmission scheme may lead to severe repetition and loss, resulting in a high frame error rate (FER).

SUMMARY

The technical problem addressed by the present disclosure is to provide an HARQ retransmission method and apparatus and a transmission device, to solve the problem of a high FER due to severe repetition and loss in HARQ retransmission in the prior art.

To solve the foregoing technical problem, the present disclosure provides in some embodiments an HARQ retransmission method. The method includes: determining a transmission parameter; and selecting dynamically a transmission starting position of each retransmission redundancy version from a circular buffer according to the transmission parameter.

Optionally, the transmission parameter at least includes a coding parameter of an LDPC code.

Optionally, the determining a transmission parameter includes: determining implicitly or explicitly the coding parameter of the LDPC code.

Optionally, the coding parameter at least includes an information bit length and a coding rate.

Optionally, the selecting dynamically a transmission starting position of each retransmission redundancy version from a circular buffer according to the transmission parameter includes: determining a version number of each retransmission redundancy version; and selecting the transmission starting position of each retransmission redundancy version from the circular buffer according to the information bit length, the coding rate, and the version number of each retransmission redundancy version.

Optionally, the coding rate includes an initial transmission code rate.

Optionally, the selecting the transmission starting position of each retransmission redundancy version from the circular buffer according to the information bit length, the coding rate, and the version number of each retransmission redundancy version includes: determining a transmission starting position $S_i$ of an $i^{th}$ retransmission redundancy version by using the following formula:

$$S_i = \frac{K}{R_0} \times RV_i + \text{offset},$$

where K is the information bit length, $R_0$ is the initial transmission code rate, $RV_i$ is a version number of the $i^{th}$ retransmission redundancy version, $RV_i=i$, i is an integer between 0 and M, M is a preset maximum quantity of retransmissions, and offset is an offset value.

Optionally, the step of selecting the transmission starting position of each retransmission redundancy version from the circular buffer according to the information bit length, the coding rate, and the version number of each retransmission redundancy version includes: determining a transmission starting position $S_i$ of an $i^{th}$ retransmission redundancy version by using the following formula:

$$S_i = \alpha \left( \frac{K}{R_0} \times RV_i + \text{offset} \right);$$

or,
determining a transmission starting position $S_i$ of an $i^{th}$ retransmission redundancy version by using the following formula:

$$S_i = \alpha \times \frac{K}{R_0} \times RV_i + \text{offset},$$

where K is the information bit length, $R_0$ is the initial transmission code rate, $RV_i$ is a version number of the $i^{th}$ retransmission redundancy version, $RV_i=i$, i is an integer between 0 and M, M is a preset maximum quantity of retransmissions, offset is an offset value, and α is a scale value.

Optionally, a transmission starting position of a latter retransmitted data frame does not overlap with a former retransmitted data frame in at least one group of two adjacent retransmission redundancy versions.

Optionally, after the selecting dynamically a transmission starting position of each retransmission redundancy version from a circular buffer according to the transmission parameter, the method further includes: retransmitting data starting from the selected transmission starting position.

Optionally, before the selecting dynamically a transmission starting position of each retransmission redundancy version from a circular buffer according to the transmission parameter, the method further includes: transferring all coded bits other than punctured bits into the circular buffer.

To solve the foregoing technical problem, the present disclosure further provides in some embodiments an HARQ retransmission apparatus. The apparatus includes: a determination module, configured to determine a transmission parameter; and a selection module, configured to select dynamically a transmission starting position of each retransmission redundancy version from a circular buffer according to the transmission parameter.

Optionally, the transmission parameter at least includes a coding parameter of an LDPC code.

Optionally, the determination module includes: a first determination submodule, configured to determine implicitly or explicitly the coding parameter of the LDPC code.

Optionally, the coding parameter at least includes an information bit length and a coding rate.

Optionally, the selection module includes: a second determination submodule, configured to determine a version number of each retransmission redundancy version; and a selection submodule, configured to select the transmission starting position of each retransmission redundancy version from the circular buffer according to the information bit length, the coding rate, and the version number of each retransmission redundancy version.

Optionally, the coding rate includes an initial transmission code rate.

Optionally, the selection submodule includes: a first determination unit, configured to determine a transmission starting position $S_i$ of an $i^{th}$ retransmission redundancy version by using the following formula:

$$S_i = \frac{K}{R_0} \times RV_i + \text{offset},$$

where K is the information bit length, $R_0$ is the initial transmission code rate, $RV_i$ is a version number of the $i^{th}$ retransmission redundancy version, $RV_i=i$, i is an integer between 0 and M, M is a preset maximum quantity of retransmissions, and offset is an offset value.

Optionally, the selection submodule includes: a second determination unit, configured to determine a transmission starting position $S_i$ of an $i^{th}$ retransmission redundancy version by using the following formula:

$$S_i = \alpha \left( \frac{K}{R_0} \times RV_i + \text{offset} \right);$$

or,
a third determination unit, configured to determine a transmission starting position $S_i$ of an $i^{th}$ retransmission redundancy version by using the following formula:

$$S_i = \alpha \times \frac{K}{R_0} \times RV_i + \text{offset},$$

where K is the information bit length, $R_0$ is the initial transmission code rate, $RV_i$ is a version number of the $i^{th}$ retransmission redundancy version, $RV_i=i$, i is an integer between 0 and M, M is a preset maximum quantity of retransmissions, offset is an offset value, and $\alpha$ is a scale value.

Optionally, a transmission starting position of a latter retransmitted data frame does not overlap with a former retransmitted data frame in at least one group of two adjacent retransmission redundancy versions.

Optionally, the HARQ retransmission apparatus further includes: a transmission module, configured to: after the selection module selects dynamically the transmission starting position of each retransmission redundancy version from the circular buffer according to the transmission parameter, retransmit data starting from the selected transmission starting position.

Optionally, the HARQ retransmission apparatus further includes: a transfer module, configured to: before the selection module selects dynamically the transmission starting position of each retransmission redundancy version from the circular buffer according to the transmission parameter, transfer all coded bits other than punctured bits into the circular buffer.

To solve the foregoing technical problem, the present disclosure further provides in some embodiments a transmission device, including a storage, a processor, and a computer program stored in the storage and configured to be executed by the processor, where the processor is configured to execute the computer program to implement the following steps: determining a transmission parameter; and selecting dynamically a transmission starting position of each retransmission redundancy version from a circular buffer according to the transmission parameter.

To solve the foregoing technical problem, the present disclosure further provides in some embodiments a computer readable storage medium storing therein a computer program, where the computer program is configured to be executed by a processor, to implement the following steps: determining a transmission parameter; and selecting dynamically a transmission starting position of each retransmission redundancy version from a circular buffer according to the transmission parameter.

The foregoing technical solutions of the present disclosure have the following beneficial effects: with the HARQ retransmission method according to the embodiments of the present disclosure, a transmission parameter is determined first; and then a transmission starting position of each retransmission redundancy version is selected dynamically from a circular buffer according to the transmission parameter. By means of such retransmissions based on dynamically selected transmission starting positions, the occurrences of repetition and loss are effectively reduced, so that a FER is reduced, and decoding performance is improved.

BRIEF DESCRIPTION OF THE DRAWINGS

To describe the technical solutions in the embodiments of the present disclosure more clearly, the accompanying drawings required for describing the embodiments of the present disclosure are briefly described hereinafter. Apparently, the drawings accompanying the following descriptions show only some embodiments of the present disclosure, and a person of ordinary skill in the art may still derive other drawings from these accompanying drawings without creative efforts.

DETAILED DESCRIPTION

To make the technical problem to be solved, technical solutions, and advantages of the present disclosure more clearly, detailed descriptions are provided below with reference to the accompanying drawings and specific embodiments.

Figure 1:
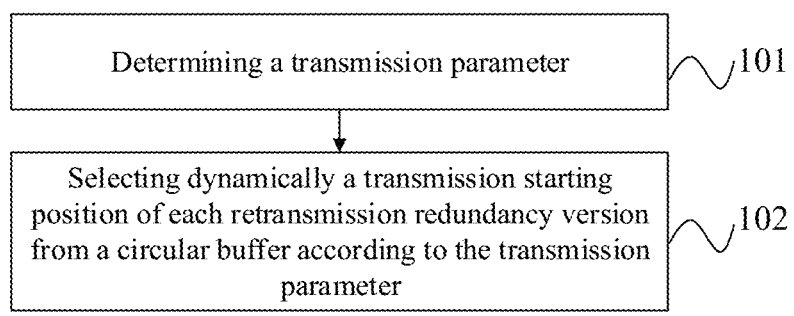
FIG. 1 is a flowchart of an HARQ retransmission method according to an embodiment of the present disclosure.
Figure 2:
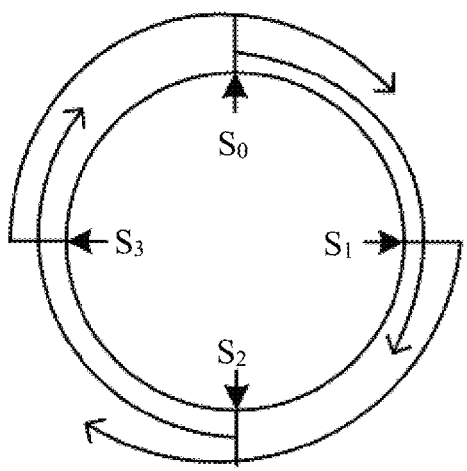
FIG. 2 is a schematic diagram of transmission using a related-art retransmission solution.

Referring to FIG. 1, the present disclosure provides in some embodiments an HARQ retransmission method. The method includes the following steps 101 and 102.

The step 101 includes: determining a transmission parameter.

Herein, a transmission parameter is determined, so that subsequently a transmission starting position of a retransmission is determined dynamically according to the transmission parameter.

The step 102 includes: selecting dynamically a transmission starting position of each retransmission redundancy version from a circular buffer according to the transmission parameter.

Herein, according to the transmission parameter, a transmission starting position of each retransmission redundancy version may be selected dynamically from the circular buffer. The dynamically selected transmission starting positions render overlaps between adjacent redundancy versions as few as possible, so that repetition, loss, and the like during retransmission can be effectively reduced.

In the HARQ retransmission method in the embodiments of the present disclosure, a transmission starting position of each retransmission is selected dynamically rather than being selected in a static and fixed manner, thereby effectively reducing the occurrences of repetition, loss and the like, so that a FER is reduced, and decoding performance is improved. Moreover, if packet loss occurs during transmission, the lost segment of information may be determined by calculation. Optionally, before the step 102, the method further includes: transferring all coded bits other than punctured bits into the circular buffer.

Coded bits of an LDPC code include information bits and parity bits. The information bits include punctured bits. Herein, the parity bits and all the information bits other than the punctured bits are transferred into the circular buffer.

In this case, the circular buffer includes all the coded bits other than the punctured bits. In the step 102, the transmission starting position of each retransmission redundancy version is selected dynamically from all the coded bits other than the punctured bits.

Optionally, after the step 102, the method further includes: retransmitting data starting from the selected transmission starting position.

In this case, data retransmission starts from the dynamically selected transmission starting position, thereby effectively reducing the occurrences of repetition, loss and the like, so that a FER is reduced, and decoding performance is improved.

The transmission parameter at least includes a coding parameter of an LDPC code.

In this case, the transmission starting position of each retransmission redundancy version may be selected dynamically from the circular buffer by using the coding parameter, thereby effectively reducing the occurrences of repetition, loss, and the like during retransmission.

The transmission parameter may further include a size of the circular buffer, a terminal grade or the like.

In this case, transmission starting positions of retransmissions may be selected dynamically by using the coding parameter in combination with the size of the circular buffer, the terminal grade or the like, thereby further effectively reducing the occurrences of repetition, loss, and the like during retransmission.

Optionally, the step 101 includes: determining implicitly or explicitly the coding parameter of the LDPC code.

In this case, the coding parameter of the LDPC code may be determined implicitly or explicitly.

Specifically, during uplink scheduling, a base station may transmit implicit or explicit signaling to the terminal to indicate the coding parameter of the LDPC code. The terminal may determine the coding parameter of the LDPC code according to an indication of the implicit or explicit signaling. During downlink scheduling, the base station may determine implicitly or explicitly the coding parameter of the LDPC code according to a scheduling requirement.

Further, the coding parameter at least includes an information bit length and a coding rate.

In this case, transmission starting positions of retransmissions may be selected dynamically according to the information bit length and the coding rate.

The information bit length and the coding rate may be determined implicitly or explicitly. For example, to determine the information bit length implicitly, the length of information bits to be transmitted of each code block may be implicitly acquired according to a code block segmentation rule. To determine the coding rate implicitly, the coding rate may be determined according to scheduling signaling such as an index indication of a modulation and coding scheme (MCS) in a physical downlink control channel (PDCCH).

Optionally, the step 102 includes the following substeps 1021 and 1022.

The substep 1021 includes: determining a version number of each retransmission redundancy version.

Herein, the version number $RV_i$ ($RV_i=1$, $i=0, 1, 2, \ldots$) of each retransmission redundancy version is determined, to facilitate the subsequent determination of the transmission starting position of each retransmission redundancy version.

$RV_0$ corresponds to a first transmission, $RV_i$ corresponds to a second transmission, $RV_2$ corresponds to a third transmission, ..., and $RV_M$ corresponds to an $(M+1)^{th}$ transmission, and M is a preset maximum quantity of retransmissions.

The substep 1022 includes: selecting the transmission starting position of each retransmission redundancy version from the circular buffer according to the information bit length, the coding rate, and the version number of each retransmission redundancy version.

Herein, by selecting dynamically the transmission starting position of each retransmission redundancy version from the circular buffer according to the information bit length, the coding rate, and the version number of each retransmission redundancy version, it can be ensured that a transmission starting position of a latter retransmitted data frame hardly overlaps with a former retransmitted data frame in at least one group of two adjacent retransmission redundancy versions, so that overlaps between adjacent redundancy versions are as few as possible.

Further, according to the HARQ retransmission method in the embodiments of the present disclosure, a transmission starting position of a latter retransmitted data frame does not overlap with a former retransmitted data frame in at least one group of two adjacent retransmission redundancy versions. In this case, in the retransmissions based on dynamically selected transmission starting positions, it can be ensured that overlaps between adjacent redundancy versions are as few as possible.

Optionally, the coding rate includes an initial transmission code rate.

In this case, an end position of the first transmission can be determined according to the information bit length and the initial transmission code rate. The transmission starting position of each retransmission redundancy version is selected dynamically from the circular buffer based on the end position of the first transmission and the version number of each retransmission redundancy version, so as to ensure that, among groups of two adjacent retransmission redundancy versions, at least a transmission starting position of a data frame of the second transmission hardly overlaps with a data frame of the first transmission, so that overlaps between adjacent redundancy versions are as few as possible.

Particularly, if each retransmission is based on the initial transmission code rate and a data frame of the same length is transmitted every time, a transmission starting position of a latter retransmitted data frame hardly overlaps with a former retransmitted data frame in every two adjacent retransmission redundancy versions.

Optionally, the substep 1022 includes: determining a transmission starting position $S_i$ of an $i^{th}$ retransmission redundancy version by using the following formula:

$$S_i = \frac{K}{R_0} \times RV_i + \text{offset}, \quad (1)$$

where K is the information bit length, $R_0$ is the initial transmission code rate, $RV_i$ is a version number of the $i^{th}$ retransmission redundancy version, $RV_i=i$, i is an integer between 0 and M, M is a preset maximum quantity of retransmissions, and offset is an offset value.

The offset may be 0 or another integer value. For example, the offset may be the size of the circular buffer, a terminal grade or the like. However, the present disclosure is not limited thereto.

In this case, based on the foregoing formula (1), the transmission starting position of each retransmission redundancy version may be determined dynamically, and it is ensured that, among groups of two adjacent retransmission redundancy versions, at least a transmission starting position of a data frame of the second transmission hardly overlaps with a data frame of the first transmission, so that overlaps between adjacent redundancy versions are as few as possible. Particularly, if each retransmission is based on the initial transmission code rate and a data frame of the same length is transmitted every time, a transmission starting position of a latter retransmitted data frame hardly overlaps with a former retransmitted data frame in every two adjacent retransmission redundancy versions.

For example, it is assumed that M is equal to 3. That is, there are a total of four retransmission redundancy versions. During the first transmission, $RV_0=0$, it may be determined that $S_0=\text{offset}$ based on the foregoing formula (1), and a data frame of a length N is transmitted starting from the $S_0^{th}$ bit, in this case, the code rate is $R_0$, and $$N = \frac{K}{R_0}.$$

During the second transmission, $RV_i=1$, it may be determined that $$S_1 = \frac{K}{R_0} + \text{offset}$$

based on the foregoing formula (1), and a data frame is transmitted starting from the $S_1^{th}$ bit. During the third transmission, $RV_2=2$, it may be determined that $$S_2 = \frac{K}{R_0} \times 2 + \text{offset}$$

based on the foregoing formula (1), and a data frame is transmitted starting from the $S_2^{th}$ bit. During the fourth transmission, $RV_3=3$, it may be determined that $$S_3 = \frac{K}{R_0} \times 3 + \text{offset}$$

based on the foregoing formula (1), and a data frame is transmitted starting from the $S_3^{th}$ bit.

Figure 3:
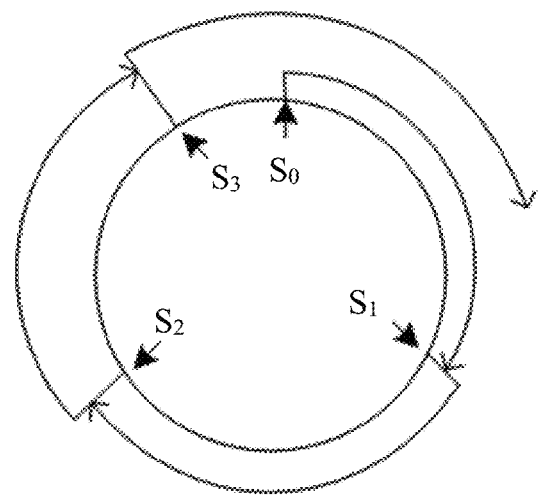
FIG. 3 is a schematic diagram of transmission using an HARQ retransmission method according to an embodiment of the present disclosure.

In this case, the transmission starting position of each retransmission redundancy version may be dynamically determined, and it is ensured that, among groups of two adjacent retransmission redundancy versions, at least a transmission starting position of a data frame of the second transmission hardly overlaps with a data frame of the first transmission, so that overlaps between adjacent redundancy versions are as few as possible. Particularly, as shown in FIG. 3, if each retransmission is based on the initial transmission code rate and a data frame of the same length is transmitted every time, a transmission starting position of a latter retransmitted data frame hardly overlaps with a former retransmitted data frame in every two adjacent retransmission redundancy versions.

Optionally, the substep 1022 includes: determining a transmission starting position $S_i$ of an $i^{th}$ retransmission redundancy version by using the following formula:

$$S_i = \alpha\left(\frac{K}{R_0} \times RV_i + \text{offset}\right), \quad (2)$$

or, determining a transmission starting position $S_i$ of an $i^{th}$ retransmission redundancy version by using the following formula:

$$S_i = \alpha \times \frac{K}{R_0} \times RV_i + \text{offset}, \quad (3)$$

where K is the information bit length, $R_0$ is the initial transmission code rate, $RV_i$ is a version number of the $i^{th}$ retransmission redundancy version, $RV_i=i$, i is an integer between 0 and M, M is a preset maximum quantity of retransmissions, offset is an offset value, and α is a scale value.

The offset may be 0 or another integer value. For example, the offset may be the size of the circular buffer, a terminal grade or the like. However, the present disclosure is not limited thereto. α is preferably not an integer value.

In this case, a scale value is added to the foregoing formula (1) to achieve more flexible selection. Similarly, based on the foregoing formula (2) or (3), the transmission starting position of each retransmission redundancy version may be determined dynamically, and it can be ensured that, among groups of two adjacent retransmission redundancy versions, at least a transmission starting position of a data frame of the second transmission hardly overlaps with a data frame of the first transmission, so that overlaps between adjacent redundancy versions are as few as possible. Particularly, if each retransmission is based on the initial transmission code rate and a data frame of the same length is transmitted every time, a transmission starting position of a latter retransmitted data frame hardly overlaps with a former retransmitted data frame in every two adjacent retransmission redundancy versions.

For example, it is assumed that M is equal to 3. That is, there are a total of four retransmission redundancy versions, offset is 0, α is 1, and each transmission is based on the initial transmission code rate $R_0$. A transmission starting position $S_i$ of an $i^{th}$ retransmission redundancy version is determined by using the following formula:

$$S_i = \frac{K}{R_0} \times RV_i. \quad (4)$$

During the first transmission, $RV_0=0$, it may be determined that $S_0=0$ based on the foregoing formula (4), and a data frame of a length N is transmitted starting from the 0th bit, in this case, the code rate is $R_0$, and $$N = \frac{K}{R_0}.$$

During the second transmission, $RV_1=1$, it may be determined that $$S_1 = \frac{K}{R_0}$$

based on the foregoing formula (4), and a data frame of a length N is transmitted starting from the $S_1^{th}$ bit, and in this case, the actual code rate is $$\frac{R_0}{2}.$$

During the third transmission, $RV_2=2$, it may be determined that $$S_2 = \frac{K}{R_0} \times 2$$

based on the foregoing formula (4), and a data frame of a length N is transmitted starting from the $S_2^{th}$ bit, in this case, the actual code rate is $$\frac{R_0}{3}.$$

During the fourth transmission, $RV_3=3$, it may be determined that $$S_3 = \frac{K}{R_0} \times 3$$

based on the foregoing formula (4), and a data frame of a length N is transmitted starting from the $S_3^{th}$ bit, in this case, the actual code rate is $$\frac{R_0}{4}.$$

In this case, the transmission starting position of each retransmission redundancy version may be determined dynamically. As shown in FIG. 3, a transmission starting position of a latter retransmitted data frame hardly overlaps with a former retransmitted data frame in every two adjacent retransmission redundancy versions.

Two simulation examples are given below to further describe the effectiveness of the HARQ retransmission method according to the embodiments of the present disclosure.

Simulation Example 1

It is assumed that in the HARQ retransmission method in the embodiments of the present disclosure, M is equal to 3, that is, there are a total of four retransmission redundancy versions; offset is 0; α is 1; and each transmission is based on the initial transmission code rate $R_0$. The transmission starting position of each retransmission redundancy version is determined by using the following formula:

$$S_i = \frac{K}{R_0} \times RV_i. \quad (4)$$

Figure 4A:
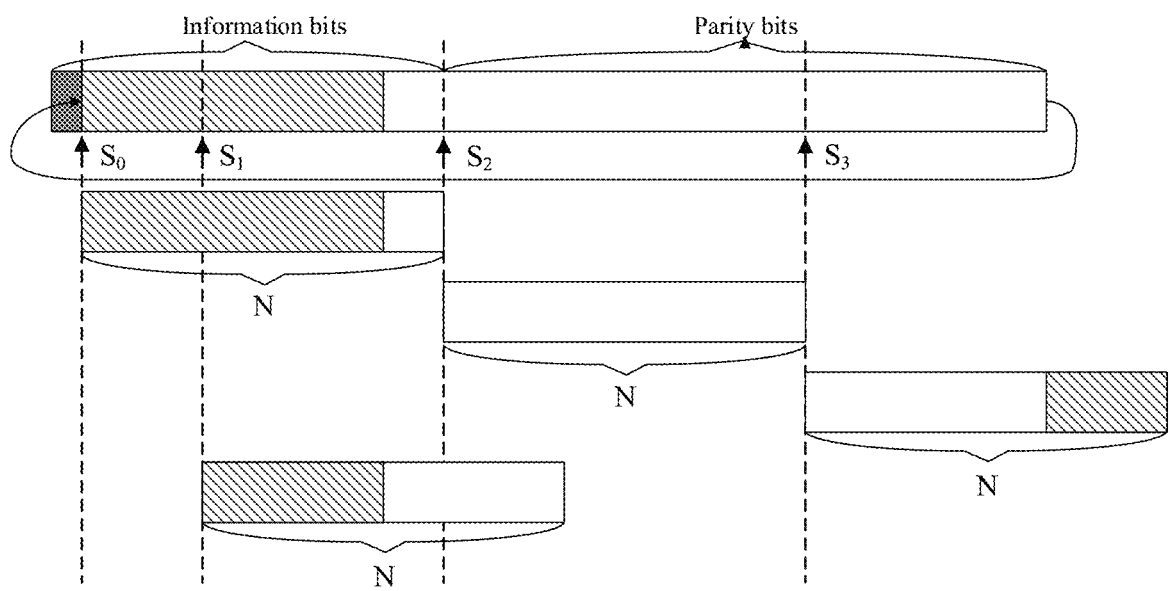
FIG. 4a is a schematic diagram of transmission using an HARQ retransmission method of the present disclosure in a simulation case 1 provided by an example of the present disclosure.
Figure 4B:
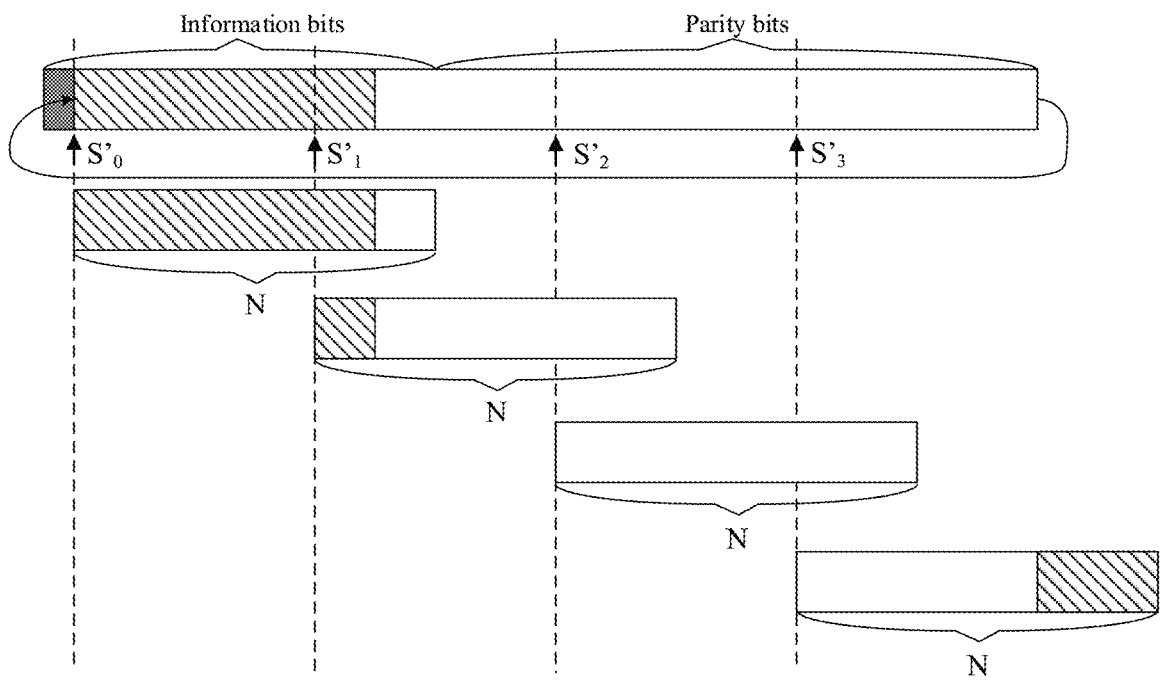
FIG. 4b is a schematic diagram of transmission using a related-art retransmission solution in the simulation case 1 provided by an example of the present disclosure.
Figure 4C:
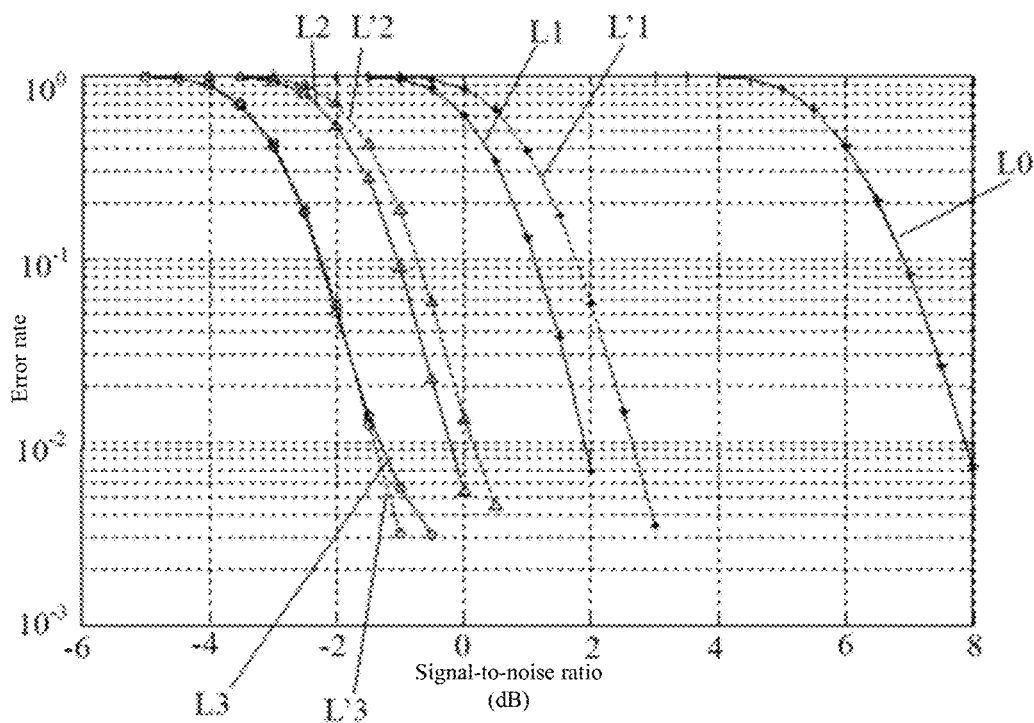
FIG. 4c is a schematic diagram of simulation in the simulation case 1 provided by an example of the present disclosure.

It is assumed that simulation parameters of an LDPC code BG1 provided in 5G that are shown in the following table 1 are used. By using the HARQ retransmission method in the embodiments of the present disclosure and selecting dynamically a transmission starting position of each retransmission redundancy version ($S_0$, $S_i$, $S_2$, $S_3$) based on the foregoing formula (4), a schematic diagram of transmission as shown in FIG. 4a is obtained. When a related-art retransmission solution is used, fixed transmission starting positions ($S'_0$, $S'_1$, $S'_2$, $S'_3$) are given and schematic diagram of transmission as shown in FIG. 4b is obtained. The simulation results obtained using the two solutions are shown in FIG. 4c, where L0, L1, L2, and L3 are sequentially simulation curves of the first transmission, the second transmission, the third transmission, and the fourth transmission obtained by using the HARQ retransmission method in the embodiments of the present disclosure, and L'1, L'2, and L'3 are sequentially simulation curves of the second transmission, the third transmission, and the fourth transmission obtained by using the related-art retransmission solution. The simulation curve of the first transmission obtained by using the related-art retransmission solution basically overlaps with L0.

that is, there are a total of four retransmission redundancy versions; offset is 0; α is 1; and each transmission is based on the initial transmission code rate $R_0$. The transmission starting position of each retransmission redundancy version is determined by using the following formula:

$$S_i = \frac{K}{R_0} \times RV_i. \tag{4}$$

TABLE 1

| | LDPC code | | | | | |
|---|---|---|---|---|---|---|
| | Information bit length K | Retransmission length | Initial transmission code rate $R_o$ | Decoder | Channel | Modulation |
| Related-art retransmission solution | 132 | 150 | 8/9 | BP decoding Maximum quantity of iterations: 50 | AWGN | QPSK |
| Retransmission solution in the present disclosure | 132 | 150 | 8/9 | BP decoding Maximum quantity of iterations: 50 | AWGN | QPSK |

As can be seen intuitively from FIG. 4a and FIG. 4b, compared with the related-art retransmission solution, a transmission starting position of a latter retransmitted data frame follows immediately an end position of a former retransmitted data frame in every two adjacent retransmission redundancy versions, and a transmission starting position of a latter retransmitted data frame hardly overlaps with a former retransmitted data frame in every two adjacent retransmission redundancy versions according to the HARQ retransmission method in the embodiments of the present disclosure. By using the HARQ retransmission method in the embodiments of the present disclosure, data retransmission starts from the selected transmission starting position, thereby effectively reducing the occurrences of repetition, loss, and the like during retransmission. As can be seen intuitively from FIG. 4c, the HARQ retransmission method in the embodiments of the present disclosure has better performance than the related-art retransmission solution. When a FER is $10^{-2}$, by using the solution of selecting dynamically a starting position in the present disclosure, a performance gain close to 0.8 dB can be obtained during the second transmission, and a performance gain close to 0.4 dB can be obtained during the third transmission.

Simulation Example 2

Figure 5A:
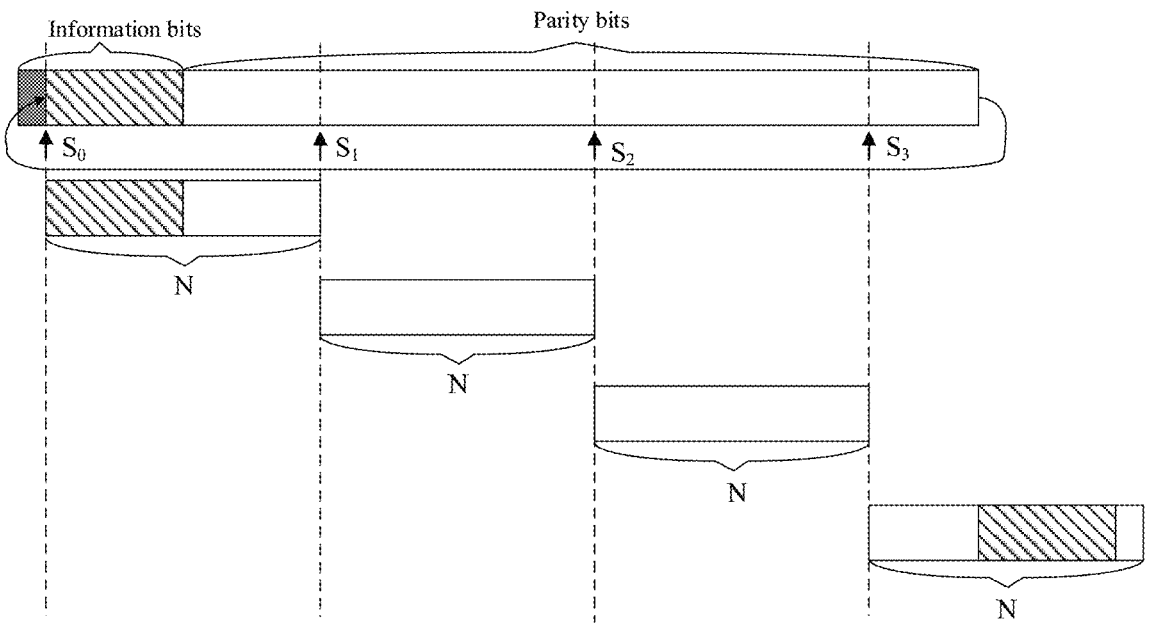
FIG. 5a is a schematic diagram of transmission using an HARQ retransmission method of the present disclosure in a simulation case 2 provided by an example of the present disclosure.
Figure 5B:
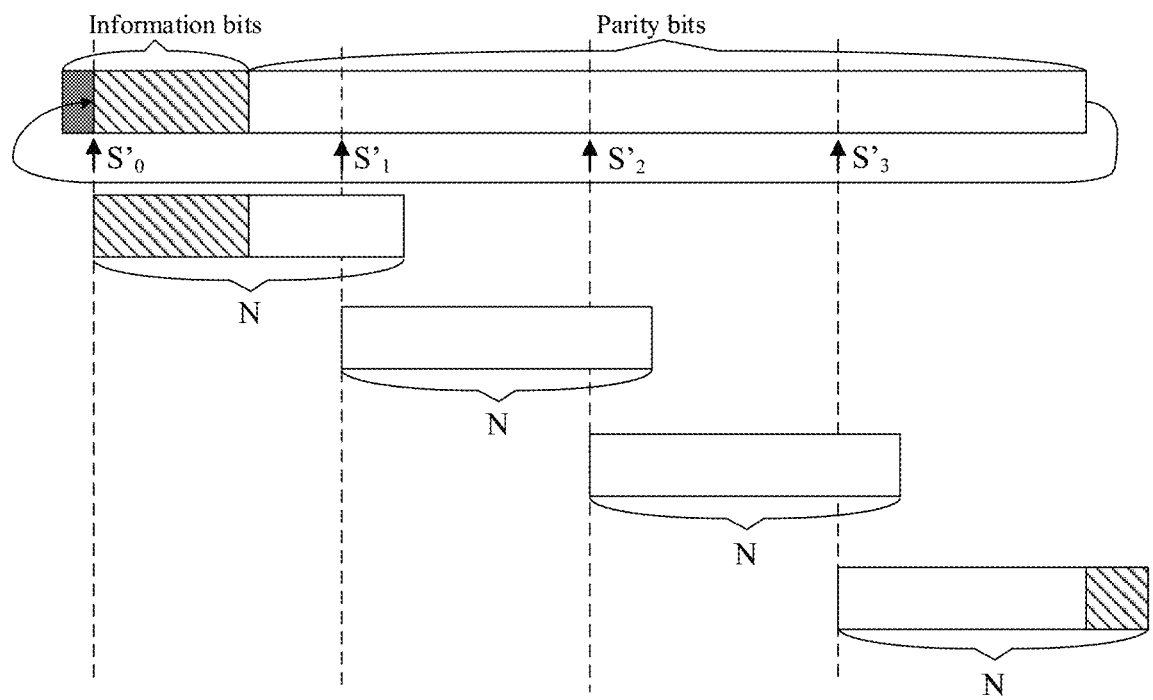
FIG. 5b is a schematic diagram of transmission using a related-art retransmission solution in the simulation case 2 provided by an example the present disclosure.
Figure 5C:
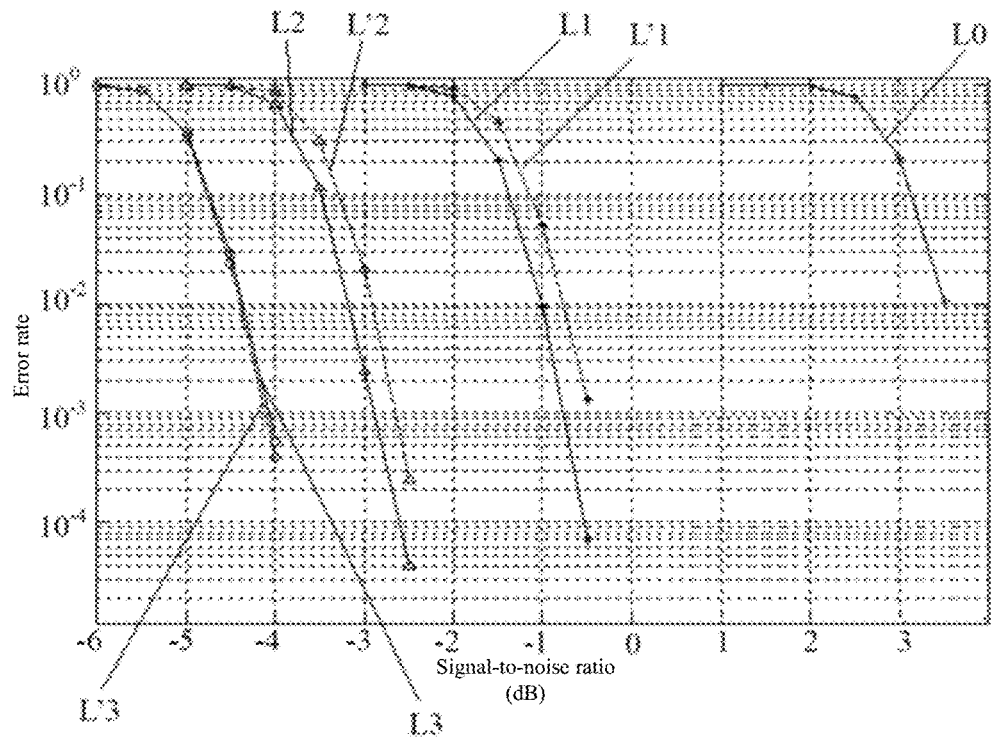
FIG. 5c is a schematic diagram of simulation in the simulation case 2 provided by an example of the present disclosure.

It is assumed that in the HARQ retransmission method in the embodiments of the present disclosure, M is equal to 3, It is assumed that simulation parameters of an LDPC code BG2 provided in 5G that are shown in the following table 2 are used. By using the HARQ retransmission method in the embodiments of the present disclosure and selecting dynamically a transmission starting position of each retransmission redundancy version ($S_0$, $S_1$, $S_2$, $S_3$) based on the foregoing formula (4), the schematic diagram of transmission as shown in FIG. 5a is obtained. When a related-art retransmission solution is used, fixed transmission starting positions ($S'_0$, $S'_1$, $S'_2$, $S'_3$) are given and the schematic diagram of transmission as shown in FIG. 5b is obtained. The simulation results obtained using the two solutions are shown in FIG. 5c, where L0, L1, L2, and L3 are sequentially simulation curves of the first transmission, the second transmission, the third transmission, and the fourth transmission obtained by using the HARQ retransmission method in the embodiments of the present disclosure, and L'1, L'2, and L'3 are sequentially simulation curves of the second transmission, the third transmission, and the fourth transmission obtained by using the related-art retransmission solution. The simulation curve of the first transmission obtained by using the related-art retransmission solution basically overlaps with L0.

TABLE 2

| | LDPC code | | | | | |
|---|---|---|---|---|---|---|
| | Information bit length K | Retransmission length | Initial transmission code rate $R_o$ | Decoder | Channel | Modulation |
| Related-art retransmission solution | 720 | 1080 | 2/3 | BP decoding Maximum quantity of iterations: 50 | AWGN | QPSK |

TABLE 2-continued

| | LDPC code | | | | | |
|---|---|---|---|---|---|---|
| | Information bit length K | Retransmission length | Initial transmission code rate $R_o$ | Decoder | Channel | Modulation |
| Retransmission solution in the present disclosure | 720 | 1080 | 2/3 | BP decoding Maximum quantity of iterations: 50 | AWGN | QPSK |

As can be seen intuitively from FIG. 5a and FIG. 5b, compared with the related-art retransmission solution, a transmission starting position of a latter retransmitted data frame follows immediately an end position of a former retransmitted data frame in every two adjacent retransmission redundancy versions, and a transmission starting position of a latter retransmitted data frame hardly overlaps with a former retransmitted data frame in every two adjacent retransmission redundancy versions according to the HARQ retransmission method in the embodiments of the present disclosure. By using the HARQ retransmission method in the embodiments of the present disclosure, data retransmission starts from the selected transmission starting position, thereby effectively reducing the occurrences of repetition, loss, and the like during retransmission. As can be seen intuitively from FIG. 5c, the HARQ retransmission method in the embodiments of the present disclosure has better performance than the related-art retransmission solution. When a FER is $10^{-2}$, by using the solution of selecting dynamically a starting position in the present disclosure, a performance gain of approximately 0.3 dB can be obtained in both the second transmission and the third transmission.

In the HARQ retransmission method in the embodiments of the present disclosure, a transmission starting position of each retransmission is selected dynamically rather than being selected in a static and fixed manner, thereby effectively reducing the occurrences of repetition, loss and the like, so that a FER is reduced, and decoding performance is improved. In addition, if packet loss occurs during transmission, the lost segment of information may be determined by calculation.

Figure 6:
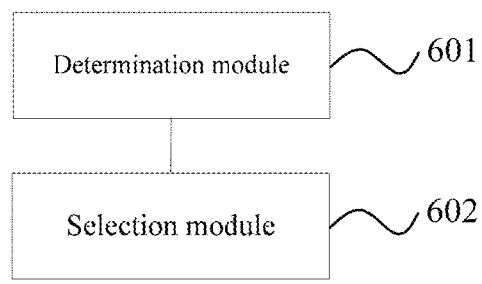
FIG. 6 is a schematic structural diagram of an HARQ retransmission apparatus according to an embodiment of the present disclosure.

Referring to FIG. 6, the present disclosure further provides in some embodiments an HARQ retransmission apparatus. The apparatus includes a determination module 601 and a selection module 602.

The determination module 601 is configured to determine a transmission parameter.

The selection module 602 is configured to select dynamically a transmission starting position of each retransmission redundancy version from a circular buffer according to the transmission parameter.

In the HARQ retransmission apparatus in the embodiments of the present disclosure, retransmissions are based on dynamically selected transmission starting positions, thereby effectively reducing the occurrences of repetition, loss and the like, so that a FER is reduced, and decoding performance is improved.

Optionally, the transmission parameter at least includes a coding parameter of an LDPC code.

Optionally, the determination module includes: a first determination submodule, configured to determine implicitly or explicitly the coding parameter of the LDPC code.

Optionally, the coding parameter at least includes an information bit length and a coding rate.

Optionally, the selection module includes: a second determination submodule, configured to determine a version number of each retransmission redundancy version; and a selection submodule, configured to select the transmission starting position of each retransmission redundancy version from the circular buffer according to the information bit length, the coding rate, and the version number of each retransmission redundancy version.

Optionally, the coding rate includes an initial transmission code rate.

Optionally, the selection submodule includes: a first determination unit, configured to determine a transmission starting position $S_i$ of an $i^{th}$ retransmission redundancy version by using the following formula:

$$S_i = \frac{K}{R_0} \times RV_i + \text{offset},$$

where K is the information bit length, $R_0$ is the initial transmission code rate, $RV_i$ is a version number of the $i^{th}$ retransmission redundancy version, $RV_i=i$, i is an integer between 0 and M, M is a preset maximum quantity of retransmissions, and offset is an offset value.

Optionally, the selection submodule includes: a second determination unit, configured to determine a transmission starting position $S_i$ of an $i^{th}$ retransmission redundancy version by using the following formula:

$$S_i = \alpha\left(\frac{K}{R_0} \times RV_i + \text{offset}\right);$$

or, a third determination unit, configured to determine a transmission starting position $S_i$ of an $i^{th}$ retransmission redundancy version by using the following formula:

$$S_i = \alpha \times \frac{K}{R_0} \times RV_i + \text{offset},$$

where K is the information bit length, $R_0$ is the initial transmission code rate, $RV_i$ is a version number of the $i^{th}$ retransmission redundancy version, $RV_i=i$, i is an integer between 0 and M, M is a preset maximum quantity of retransmissions, offset is an offset value, and $\alpha$ is a scale value.

Optionally, a transmission starting position of a latter retransmitted data frame does not overlap with a former retransmitted data frame in at least one group of two adjacent retransmission redundancy versions.

Optionally, the HARQ retransmission apparatus further includes: a transmission module, configured to: after the selection module selects dynamically the transmission starting position of each retransmission redundancy version from the circular buffer according to the transmission parameter, retransmit data starting from the selected transmission starting position.

Optionally, the HARQ retransmission apparatus further includes: a transfer module, configured to: before the selection module selects dynamically the transmission starting position of each retransmission redundancy version from the circular buffer according to the transmission parameter, transfer all coded bits other than punctured bits into the circular buffer.

In the HARQ retransmission apparatus in the embodiments of the present disclosure, retransmissions are based on dynamically selected transmission starting positions, thereby effectively reducing the occurrences of repetition, loss and the like, so that a FER is reduced, and decoding performance is improved.

It should be noted that the HARQ retransmission apparatus is an apparatus corresponding to the foregoing HARQ retransmission method. All implementations in the foregoing method embodiment are applicable to the apparatus embodiment and can achieve similar technical effects.

Figure 7:
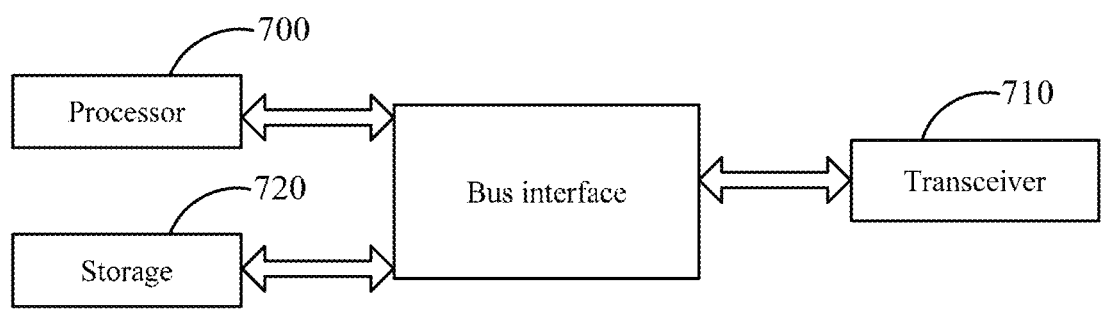
FIG. 7 is a schematic structural diagram of a transmission device according to an embodiment of the present disclosure.

Referring to FIG. 7, the present disclosure further provides in some embodiments a transmission device, including a storage 720, a processor 700, a transceiver 710, a bus interface, and a computer program stored in the storage 720 and configured to be executed by the processor 700, where the processor 700 is configured to read the program in the storage 720 to perform the following process: determining a transmission parameter; and selecting dynamically a transmission starting position of each retransmission redundancy version from a circular buffer according to the transmission parameter.

In FIG. 7, a bus architecture may include any quantity of interconnected buses and bridges. Specifically, various circuits such as one or more processors represented by the processor 700 and a storage represented by the storage 720 are linked together. The bus architecture may also link various other circuits such as peripherals, voltage regulators, and power management circuits, which are well known in the art, and therefore are not further described herein. The bus interface provides an interface. The transceiver 710 may include a plurality of elements, that is, a transmitter and a transceiver, to provide units for communicating with various other apparatuses over a transmission medium. The processor 700 is responsible for managing the bus architecture and general processing. The storage 720 can store data used by the processor 700 while performing operations.

Optionally, the transmission parameter at least includes a coding parameter of an LDPC code.

Optionally, the processor 700 is further configured to determine implicitly or explicitly the coding parameter of the LDPC code.

Optionally, the coding parameter at least includes an information bit length and a coding rate.

Optionally, the processor 700 is further configured to: determine a version number of each retransmission redundancy version; and select the transmission starting position of each retransmission redundancy version from the circular buffer according to the information bit length, the coding rate, and the version number of each retransmission redundancy version.

Optionally, the coding rate includes an initial transmission code rate.

Optionally, the processor 700 is further configured to determine a transmission starting position $S_i$ of an $i^{th}$ retransmission redundancy version by using the following formula:

$$S_i = \frac{K}{R_0} \times RV_i + \text{offset},$$

where K is the information bit length, $R_0$ is the initial transmission code rate, $RV_i$ is a version number of the $i^{th}$ retransmission redundancy version, $RV_i$=i, i is an integer between 0 and M, M is a preset maximum quantity of retransmissions, and offset is an offset value.

Optionally, the processor 700 is further configured to: determine a transmission starting position $S_i$ of an $i^{th}$ retransmission redundancy version by using the following formula:

$$S_i = \alpha \left( \frac{K}{R_0} \times RV_i + \text{offset} \right);$$

or, determine a transmission starting position $S_i$ of an $i^{th}$ retransmission redundancy version by using the following formula:

$$S_i = \alpha \times \frac{K}{R_0} \times RV_i + \text{offset},$$

where K is the information bit length, $R_0$ is the initial transmission code rate, $RV_i$ is a version number of the $i^{th}$ retransmission redundancy version, $RV_i$=i, i is an integer between 0 and M, M is a preset maximum quantity of retransmissions, offset is an offset value, and $\alpha$ is a scale value.

Optionally, a transmission starting position of a latter retransmitted data frame does not overlap with a former retransmitted data frame in at least one group of two adjacent retransmission redundancy versions.

Optionally, the processor 700 is further configured to retransmit data starting from the selected transmission starting position.

Optionally, the processor 700 is further configured to transfer all coded bits other than punctured bits into the circular buffer.

The present disclosure further provides in some embodiments a computer readable storage medium storing therein a computer program, where the computer program is configured to be executed by a processor, to implement the following steps: determining a transmission parameter; and selecting dynamically a transmission starting position of each retransmission redundancy version from a circular buffer according to the transmission parameter.

Optionally, the transmission parameter at least includes a coding parameter of an LDPC code.

Optionally, the computer program is configured to be executed by the processor to further implement the following step: determining implicitly or explicitly the coding parameter of the LDPC code.

Optionally, the coding parameter at least includes an information bit length and a coding rate.

Optionally, the computer program is configured to be executed by the processor to further implement the following steps: determining a version number of each retransmission redundancy version; and selecting the transmission starting position of each retransmission redundancy version from the circular buffer according to the information bit length, the coding rate, and the version number of each retransmission redundancy version.

Optionally, the coding rate includes an initial transmission code rate.

Optionally, the computer program is configured to be executed by the processor to further implement the following step: determining a transmission starting position $S_i$ of an $i^{th}$ retransmission redundancy version by using the following formula:

$$S_i = \frac{K}{R_0} \times RV_i + \text{offset},$$

where K is the information bit length, $R_0$ is the initial transmission code rate, $RV_i$ is a version number of the $i^{th}$ retransmission redundancy version, $RV_i=i$, i is an integer between 0 and M, M is a preset maximum quantity of retransmissions, and offset is an offset value.

Optionally, the computer program is configured to be executed by the processor to further implement the following step: determining a transmission starting position $S_i$ of an $i^{th}$ retransmission redundancy version by using the following formula:

$$S_i = \alpha\left(\frac{K}{R_0} \times RV_i + \text{offset}\right);$$

or,
determining a transmission starting position $S_i$ of an $i^{th}$ retransmission redundancy version by using the following formula:

$$S_i = \alpha \times \frac{K}{R_0} \times RV_i + \text{offset},$$

where K is the information bit length, $R_0$ is the initial transmission code rate, $RV_i$ is a version number of the $i^{th}$ retransmission redundancy version, $RV_i=i$, i is an integer between 0 and M, M is a preset maximum quantity of retransmissions, offset is an offset value, and $\alpha$ is a scale value.

Optionally, a transmission starting position of a latter retransmitted data frame does not overlap with a former retransmitted data frame in at least one group of two adjacent retransmission redundancy versions.

Optionally, the computer program is configured to be executed by the processor to further implement the following step: retransmitting data starting from the selected transmission starting position.

Optionally, the computer program is configured to be executed by the processor to further implement the following step: transferring all coded bits other than punctured bits into the circular buffer.

It should be understood that, in the embodiments of the present disclosure, sequence numbers of the foregoing processes do not necessarily mean execution sequences, rather, the execution sequences of the processes should be determined according to functions and inherent logic of the processes, and the sequence numbers should not be construed as any limitation of the implementation processes of the embodiments of the present disclosure.

The foregoing only describes preferred implementations of the present disclosure. It should be noted that for a person of ordinary skill in the art, several improvements and modifications may further be made without departing from the principle of the present disclosure. These improvements and modifications should also be deemed as falling within the scope of the present disclosure.

What is claimed is:

1. A hybrid automatic repeat request (HARD) retransmission method, comprising:
determining a transmission parameter; and
selecting dynamically a transmission starting position of each retransmission redundancy version from a circular buffer according to the transmission parameter;
wherein the transmission parameter at least comprises a coding parameter of a low-density parity-check (LDPC) code, the coding parameter at least comprises an information bit length and a coding rate;
wherein the selecting dynamically the transmission starting position of each retransmission redundancy version from the circular buffer according to the transmission parameter comprises:
determining a version number of each retransmission redundancy version; and
selecting the transmission starting position of each retransmission redundancy version from the circular buffer according to the information bit length, the coding rate, and the version number of each retransmission redundancy version;
wherein, after the selecting dynamically the transmission starting position of each retransmission redundancy version from the circular buffer according to the transmission parameter, the method further comprises:
retransmitting data starting from the selected transmission starting position;
wherein the selecting the transmission starting position of each retransmission redundancy version from the circular buffer according to the information bit length, the coding rate, and the version number of each retransmission redundancy version comprises:
determining a transmission starting position $S_i$ of an $i^{th}$ retransmission redundancy version by using the following formula:

$S_i=K/R_0 \times RV_i+\text{offset}$;

or,
determining the transmission starting position $S_i$ of the $i^{th}$ retransmission redundancy version by using the following formula:

$S_i=\alpha(K/R_0 \times RV_i+\text{offset})$;

or,
determining the transmission starting position $S_i$ of the $i^{th}$ retransmission redundancy version by using the following formula:

$S_i=\alpha K/R_0 \times RV_i+\text{offset}$;

wherein K is the information bit length, $R_0$ is the initial transmission code rate, $RV_i$ is a version number of the $i^{th}$ retransmission redundancy version, $RV_i=i$ is an integer between 0 and M, M is a preset maximum quantity of retransmissions, offset is an offset value, and $\alpha$ is a scale value.

2. The HARQ retransmission method according to claim 1, wherein the determining the transmission parameter comprises:

determining implicitly or explicitly the coding parameter of the LDPC code.

3. The HARQ retransmission method according to claim 1, wherein a transmission starting position of a latter retransmitted data frame does not overlap with a former retransmitted data frame in at least one group of two adjacent retransmission redundancy versions.

4. The HARQ retransmission method according to claim 1, wherein, before the selecting dynamically the transmission starting position of each retransmission redundancy version from the circular buffer according to the transmission parameter, the method further comprises:

transferring all coded bits other than punctured bits into the circular buffer.

5. A transmission device, comprising a storage, a processor, and a computer program stored in the storage and configured to be executed by the processor, wherein the processor is configured to execute the computer program to implement the following steps:

determining a transmission parameter; and selecting dynamically a transmission starting position of each retransmission redundancy version from a circular buffer according to the transmission parameter;

wherein the transmission parameter at least comprises a coding parameter of a low-density parity-check (LDPC) code, the coding parameter at least comprises an information bit length and a coding rate;

wherein the processor is configured to execute the computer program to further implement the following steps:

determining a version number of each retransmission redundancy version; and selecting the transmission starting position of each retransmission redundancy version from the circular buffer according to the information bit length, the coding rate, and the version number of each retransmission redundancy version;

wherein the processor is further configured to retransmit data starting from the selected transmission starting position;

wherein the selecting the transmission starting position of each retransmission redundancy version from the circular buffer according to the information bit length, the coding rate, and the version number of each retransmission redundancy version comprises:

determining a transmission starting position $S_i$ of an $i^{th}$ retransmission redundancy version by using the following formula:

$S_i = K/R_0 \times RV_i + \text{offset}$;

or, determining the transmission starting position $S_i$ of the $i^{th}$ retransmission redundancy version by using the following formula:

$S_i = \alpha(K/R_0 \times RV_i + \text{offset})$;

or, determining the transmission starting position $S_i$ of the $i^{th}$ retransmission redundancy version by using the following formula:

$S_i = \alpha K/R_0 \times RV_i + \text{offset}$;

wherein K is the information bit length, $R_0$ is the initial transmission code rate, $RV_i$ is a version number of the $i^{th}$ retransmission redundancy version, $RV_i = i$ is an integer between 0 and M, M is a preset maximum quantity of retransmissions, offset is an offset value, and α is a scale value.

6. A non-transitory computer readable storage medium storing therein a computer program, wherein the computer program is configured to be executed by a processor, to implement the following steps:

determining a transmission parameter; and selecting dynamically a transmission starting position of each retransmission redundancy version from a circular buffer according to the transmission parameter wherein the transmission parameter at least comprises a coding parameter of a low-density parity-check (LDPC) code, the coding parameter at least comprises an information bit length and a coding rate;

wherein the computer program is configured to be executed by the processor to further implement the following steps: determining a version number of each retransmission redundancy version; and selecting the transmission starting position of each retransmission redundancy version from the circular buffer according to the information bit length, the coding rate, and the version number of each retransmission redundancy version;

wherein the computer program is configured to be executed by the processor to further implement the following step: retransmitting data starting from the selected transmission starting position;

wherein the selecting the transmission starting position of each retransmission redundancy version from the circular buffer according to the information bit length, the coding rate, and the version number of each retransmission redundancy version comprises:

determining a transmission starting position $S_i$ of an $i^{th}$ retransmission redundancy version by using the following formula:

$S_i = K/R_0 \times RV_i + \text{offset}$;

or, determining the transmission starting position $S_i$ of the $i^{th}$ retransmission redundancy version by using the following formula:

$S_i = \alpha(K/R_0 \times RV_i + \text{offset})$;

or, determining the transmission starting position $S_i$ of the $i^{th}$ retransmission redundancy version by using the following formula:

$S_i = \alpha K/R_0 \times RV_i + \text{offset}$;

wherein K is the information bit length, $R_0$ is the initial transmission code rate, $RV_i$ is a version number of the $i^{th}$ retransmission redundancy version, $RV_i = i$, i is an integer between 0 and M, M is a preset maximum quantity of retransmissions, offset is an offset value, and α is a scale value.

7. The transmission device according to claim 5, wherein the processor is configured to execute the computer program to further implement the following step:

determining implicitly or explicitly the coding parameter of the LDPC code.

* * * * *